United States Patent [19]

Lentz et al.

[11] Patent Number: 4,769,522
[45] Date of Patent: Sep. 6, 1988

[54] METHOD AND APPARATUS FOR LASER BEAM WELDING OF LONGITUDINAL SEAMS IN CONTAINER BODIES

[75] Inventors: Norbert Lentz; Richard Nahrgang; Reinhard Müller, all of Essen, Fed. Rep. of Germany

[73] Assignee: Fried. Krupp Gesellschaft mit beschränkter Haftung, Essen, Fed. Rep. of Germany

[21] Appl. No.: 95,149

[22] Filed: Sep. 11, 1987

[30] Foreign Application Priority Data

Sep. 11, 1986 [DE] Fed. Rep. of Germany ....... 3630889

[51] Int. Cl.⁴ .............................................. B23K 26/00
[52] U.S. Cl. ........................... 219/121.63; 219/121.64; 219/121.76; 219/121.77
[58] Field of Search ............... 219/121 LC, 121 LD, 219/121 LS, 121 LT, 121 LW, 121 EC, 121 ED, 121 PJ, 121 PK

[56] References Cited

U.S. PATENT DOCUMENTS

| | | | |
|---|---|---|---|
| 4,237,363 | 7/1980 | Lemelson | 219/121 LM |
| 4,315,132 | 2/1982 | Savrin et al. | 219/121 LC |
| 4,354,090 | 10/1982 | Nilsen | 219/121 LC |
| 4,675,489 | 6/1987 | Opprecht et al. | 219/121 LC X |

FOREIGN PATENT DOCUMENTS

| | | |
|---|---|---|
| 2701427 | 3/1977 | Fed. Rep. of Germany . |
| 2647082 | 7/1977 | Fed. Rep. of Germany . |
| 2920428 | 10/1980 | Fed. Rep. of Germany . |
| 3219252 | 1/1982 | Fed. Rep. of Germany . |
| 0030493 | 2/1984 | Japan .......................... 219/121 LD |
| 0076690 | 5/1984 | Japan .......................... 219/121 LD |
| 0046890 | 3/1985 | Japan .......................... 219/121 LD |

Primary Examiner—C. L. Albritton
Attorney, Agent, or Firm—Spencer & Frank

[57] ABSTRACT

Method and apparatus for laser-beam welding of longitudinal seams in container bodies feature overlapping longitudinal ends of a metal sheet, the length of the transverse ends of which exceeds a predetermined circumferential dimension for the container body, into such a position relative to one another that they form an acute angle and define an angular opening, and the edge of one longitudinal end is oriented toward the inner face of the other longitudinal end. At least one focused laser beam, which is capable of relative movement with respect to this angular opening and parallel to the longitudinal ends, is aimed into the angular opening and locally melts portions of the longitudinal ends. The locally-molten longitudinal end portions are pressed against one another before they drop below the welding temperature to form a welded longitudinal seam.

18 Claims, 9 Drawing Sheets

METHOD AND APPARATUS FOR LASER BEAM WELDING OF LONGITUDINAL SEAMS IN CONTAINER BODIES

BACKGROUND OF THE INVENTION

1. Field of the Invention

The invention relates to a method for producing sheet-metal container bodies having a longitudinal seam welded by a laser beam, and to an apparatus for performing the method.

2. Description of the Related Art

Published Federal Republic of Germany Patent Application (Offenlegungsschrift) No. 27 01 427 discloses a method for producing container bodies from sheet metal with straight longitudinal ends joined into a longitudinal seam by abutting the edges of the longitudinal end, followed by laser beam welding of the abutted edges. With this method, satisfactory seams are attainable at welding speeds of up to approximately 30 m/min. At higher welding speeds, irregularities or flaws, such as cracks, shrink holes or pores, have been found to appear in the welded seam. Such irregularities occur in part because of stresses due to a steep temperature drop in the areas of the metal sheet adjoining the abutted edges.

Published Federal Republic of Germany Patent Application (Offenlegungsschrift) No. 29 20 428 discloses a method and apparatus for producing laser beam welded hollow sections (pre-forms) in which both longitudinal ends of the pre-formed section are bent in the same direction and are oriented radially outwardly and pushed together before being welded. In this method, it is accordingly difficult, without further machining, to obtain a smooth welded seam.

Published Federal Republic of Germany Patent Application (Offenlegungsschrift) No. 32 19 252 discloses a method for welding metal parts that have a particularly defined geometric shape which they must retain and a relatively great sheet thickness, for example, a platform and web of a brake shoe. The metal parts in their final shape are urged into contact with one another and are welded together by means of a focused laser beam, electron beam or plasma beam. In order to counteract the strain in the metal parts caused by the heat of welding, an additional force is exerted on the connection of the metal parts in the vicinity of the welding site, for instance by means of a roller.

Published Federal Republic of Germany Patent Application (Offenlegungsschrift) No. 26 47 082 discloses a method in which two strips that each move in their longitudinal extension are joined at an angle to form a mutually overlapping connection in the direction of movement and are pressed together by a pair of pressure rollers. A focused laser beam is aimed at the region in which the two strips run together, effecting a continuous weld of the overlapping seam.

Finally, U.S. Pat. No. 4,237,363 discloses a method for spot welding or line welding together two flat stacked sheets in which an electron beam or laser beam is aimed at the outside of one of the sheet elements. An attendant disadvantage of this method is that the surface of one of the sheet elements is marred by the electron or laser beam.

SUMMARY OF THE INVENTION

It is an object of the present invention to devise a method for producing container bodies from body blanks of sheet metal with longitudinal seams welded by means of a laser beam, with which method a satisfactory seam quality is attainable even at high welding speeds, such as welding speeds in excess of 30 m/min.

It is a further object of the present invention to devise an apparatus for performing the method.

These objects are accomplished by providing a method for laser beam welding of longitudinal seams in container bodies having a predetermined circumferential dimension, characterized in that a metal blank or sheet is used having opposite first and second longitudinal ends and opposing first and second transverse ends, the first and second longitudinal ends each having a length, a longitudinal edge, and an inner face and an outer face, the transverse ends each having a length which exceeds the predetermined circumferential length of the container body. The first and second longitudinal end of the sheet, either during or after the formation of the shape of the container body, are overlapped, i.e., the first longitudinal end is moved toward and over the second longitudinal end into such a position that, as seen in cross section, they form an acute angle and define an angular opening therebetween by orienting the edge of the second longitudinal end toward the inner face of the first longitudinal end. At least one focused laser beam is aimed into the angular opening and relative movement is effected between the at least one focused laser beam and the angular opening along its longitudinal extension. At least a portion of the respective faces of the first and second longitudinal ends that form the acute angle, i.e., the inner face of the first longitudinal end and the outer face of the second longitudinal end, are heated to a temperature above the welding temperature and the first and second longitudinal ends, prior to dropping below the welding temperature, are pressed together thereby forming a welded longitudinal seam for the container body.

The term "longitudinal ends" as used herein is not intended to mean that these ends are necessarily long ends, such that the container blank is necessarily longer than its width or circumferential dimension. Rather, the term refers to the ends to be joined that are moved "longitudinally" past the laser beam for welding and encompasses ends whose length is shorter than the width or circumferential dimension of the container blank, and visa versa.

The term "circumferential dimension" of the container blank as used herein is not limited to a blank forming a cylindrical container body having a circular cross section, but is intended to refer to the dimension of the blank corresponding to a periphery of the container body, regardless of the shape or cross section of the container body. The container body may have any cross section including, for example, circular, square, rectangular, etc.

By forming an acute angle between the longitudinal ends of the metal sheet, the faces of the sheet that are to be joined together can be heated by the at least one focused laser beam and brought to a dough-like or molten state, while the respective obverse faces of the longitudinal ends continue to have a predominantly solid structure. The immediately ensuing pressing against one another of the longitudinal ends, i.e., the pressing together of the molten face portions of the longitudinal ends, creates a firm seam connection upon cooling.

The materials being pressed together deform. Advantageously, the deformation of the material is not limited merely to the molten or dough-like region, however, the peripheral regions adjacent to the seam site are also deformed. These regions are deformed plastically, that is, permanently, and the deformation preferably takes place at right angles to the pressing force being exerted. Since the deformation is usually permanently effected in and around the area of the welded longitudinal seam, the shrinkage strains that occur with rapid cooling of the molten material and the adjacent regions of the seam site are largely compensated for, that is, reduced. The danger of fissuring in the weld is counteracted in this way.

Further advantageous features of the inventive method are attained as follows. By pressing the second longitudinal end flush with and inwardly against a forming mandrel, and forming the acute angle between the two longitudinal ends by bending the first longitudinal end, good guidance of the longitudinal ends on the forming mandrel is attained. Alternately, the acute angle formed between the longitudinal ends of the sheet may be produced by raising and extending at a tangent the second longitudinal end, which is substantially flat, away from a forming mandrel and moving the first longitudinal end, which is likewise substantially flat, so that its inner face approaches the edge of the second longitudinal end. In this way, the acute angle between the longitudinal ends can be formed without having to bend one longitudinal end. However, the first longitudinal end, prior to having its inner face approach the edge of the second longitudinal end, may be bent outwardly and with the additional bending, the angle of the angular opening can be made larger.

To take into account the various reflective or absorptive capacities of the faces of the longitudinal ends of the container blank that are to be pressed into contact while at or above the welding temperature, the axis of the at least one focused laser beam may be variable. The vertical projection of the axis of the at least one focused laser beam onto a tangential plane through the welded longitudinal seam may form an angle which ranges between 10° and 170°, preferably between 45° and 90°, with the portion of the vertical longitudinal central plane oriented counter to the feed direction of the metal sheet, that is, with the vertical longitudinal central plane when viewed in the feed direction. To attain an optimal distribution of heat to the contact or weld faces, especially when the faces have different properties, the axis of the at least one laser beam also may be pivotable about a horizontal axis.

Thus, the at least one focused laser beam may be caused to meet the faces of the longitudinal ends which are intended to form the longitudinal seam in such a manner that the axis of the at least one focused laser beam is inclined, as viewed from its focal point, by an angle of up to 45° upwardly and by an angle of up to 10° downwardly with respect to a tangential plane passing through the longitudinal seam to be formed.

When the respective faces of the longitudinal ends after having been heated by the at least one focused laser beam are pressed together in such a manner that the remaining thickness of the longitudinal seam is less than the sum of the original sheet thicknesses of the longitudinal ends, the container blanks are simpler to machine in subsequent machining operations, such as flanging or beading.

The objects of the present invention are additionally accomplished by providing an apparatus for performing the inventive method having a pair of pressure rollers by means of which the longitudinal ends are pressed together before they drop below the welding temperature. The clearance space between the pressure rollers is adjusted to an amount in accordance with the inventive method and at least one of the pressure rollers is drivable.

More particularly, the apparatus has an arrangement for guiding and positioning a metal sheet, which may be a preformed container blank, which metal sheet has opposing first and second longitudinal ends that are to be welded. The apparatus has an arrangement for overlapping the first and second longitudinal ends and forming an angular opening therebetween, including a forming mandrel, and has an optical device for supplying at least one focused laser beam, for performing the inventive method. The optical device is angularly variably adjustable with respect to a vertical longitudinal central plane through the longitudinal seam to be welded and through the axis of the forming mandrel and is aimed into the angular opening. The pair of pressure rollers are positioned vertically one above the other and above and below, that is, on either side of, the overlapping first and second longitudinal ends. The resultant thickness of the welded longitudinal seam may be controlled by exerting pressure upon the pressure rollers. In the above apparatus, at least one pressure roller may be movably supported transversely to the feed direction with respect to the other pressure roller and may be acted upon with pressure in a direction toward the pair of pressure rollers by an adjustable force.

In order to raise one longitudinal end of the sheet away from the forming mandrel, a strip positioned along the vertical longitudinal central plane and protruding beyond the surface of the forming mandrel may be provided. In order to form the angular opening, a feed roller may also provided.

One longitudinal end can be bent at an angle if the arrangement for forming the angular opening between the longitudinal ends of the sheet has two pairs of profile rollers having running faces adapted to the container body. The profile roller pair for one longitudinal end has one roller located outside the forming mandrel and has a segment tapering toward the other longitudinal end, and one roller located at least partly in the forming mandrel and having a correspondingly widening flange. Some of the profile rollers can simultaneously act as a conveyor device for the container body if the respective outer rollers are drivable.

In the simplest case, the circumferential faces of the pressure rollers are cylindrical or slightly convex. However, in order to preserve the pre-formed shape, especially for small, cylindrical container blanks, the outer pressure roller may be provided with a concave circumferential face, and the inner pressure roller with a convex circumferential face. Moreover, to reduce their wear, the pressure rollers may be made of a material having high thermal conductivity, and they may have a circumferential ring of heat-resistant material forming the running faces thereof. They may also be provided with hollow spaces for the flow therethrough of coolants.

BRIEF DESCRIPTION OF THE DRAWING

Exemplary embodiments of the invention are schematically shown in the drawing, in some cases with highly exaggerated proportions. Further objects and advantages of the present invention and the structure and operation of the apparatus will become apparent from the following detailed descriptions taken in conjunction with the drawing in which.

DESCRIPTION OF THE PREFERRED EMBODIMENTS

Figure 1:
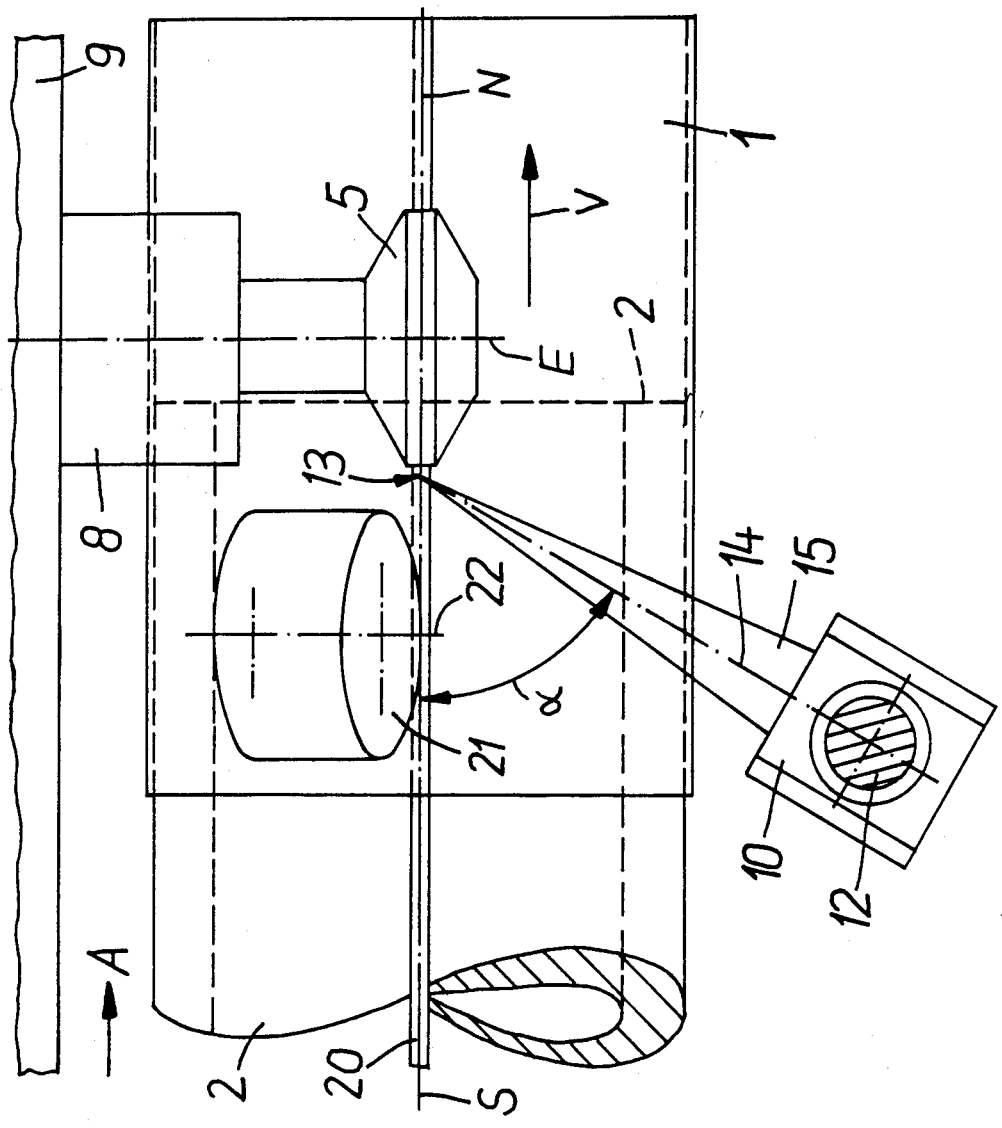
FIG. 1 is a fragmentary plan view of the apparatus for laser pressure welding of an overlapping seam of a container blank.
Figure 2:
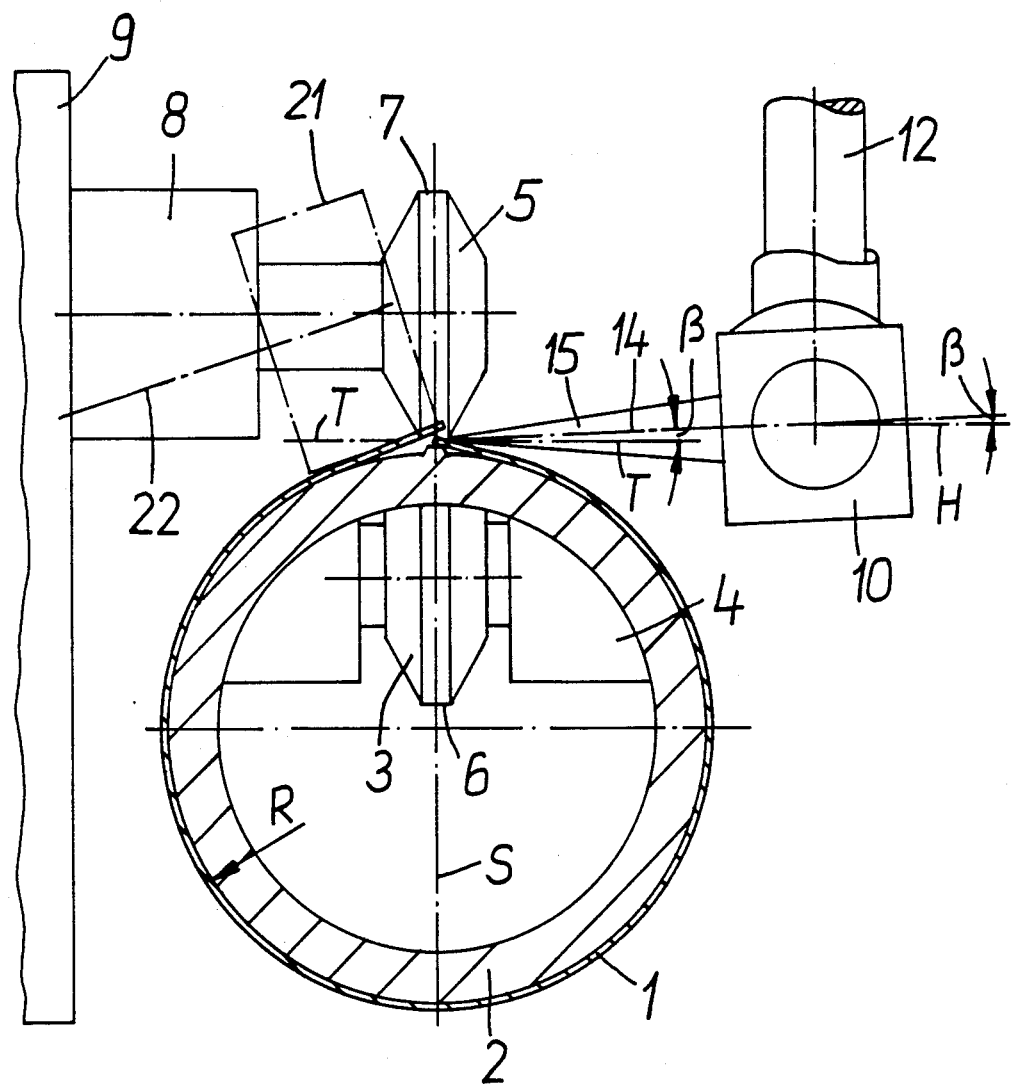
FIG. 2 is a front view, partly in cross section, of the apparatus of FIG. 1 taken along the arrow A of FIG. 1.
Figure 3:
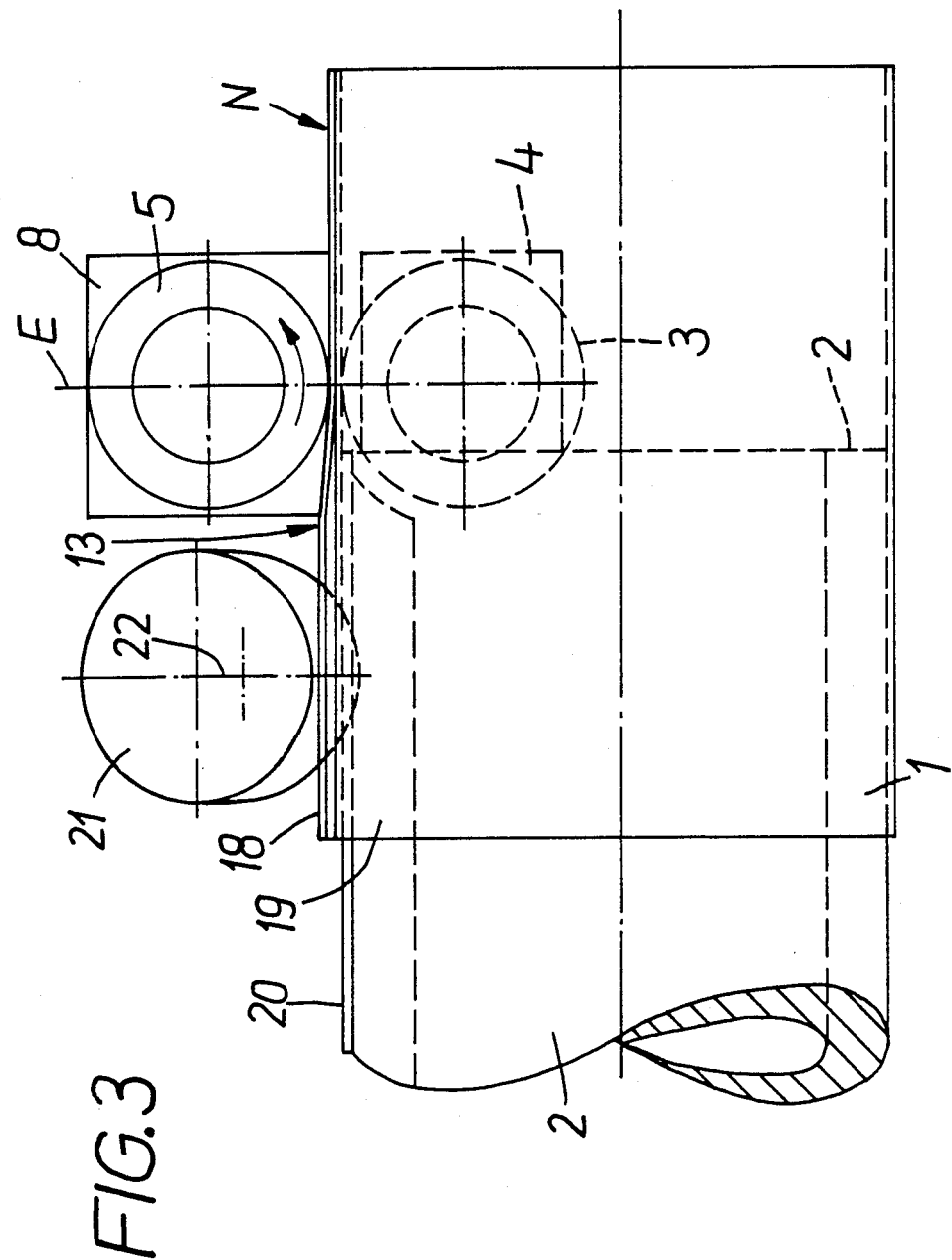
FIG. 3 is a fragmentary side view of the apparatus of FIG. 1.

The apparatus according to FIGS. 1-3 for welding longitudinal seam N, which is an overlapped seam, to form container body 1 has a forming mandrel 2 on the end of which a pressure roller 3 is supported, freely rotatably, in a support arm arrangement 4 which is secured to the forming mandrel 2. The support arm arrangement 4 is adjustable in height (in a manner not shown) relative to the forming mandrel 2, and the pressure roller 3 has an axis of rotation which is disposed behind the forming mandrel 2 as seen in feed direction V of the container body 1 that is to be welded. A counterpart pressure roller 5 that is drivable by a drive means (not shown) is disposed above the pressure roller 3. The axes of rotation of the pressure rollers 3, 5, which are each provided with a respective cylindrical circumferential face 6, 7, are disposed horizontally parallel to one another, and vertically one above the other. The counterpart pressure roller 5 is overhung-mounted in a bearing block 8, which in turn is secured to a base plate 9, which is a frame member of the apparatus. Because of the adjustability in height of the support arm arrangement 4, clearance space $a_0$ (see FIG. 10) between the cylindrical circumferential faces 6 and 7 of the rollers 3 and 5 is also variably adjustable.

The apparatus shown in FIG. 1 also has an optical device 10, which concentrates or focuses a laser beam 12 into a focused laser beam 15 having a focal point 13. The forming mandrel 2 has a vertical longitudinal central plane S and focal point 13 is located in the vertical longitudinal central planes ahead of a plane E defined by the axes of rotation of pressure rollers 3, 5. Vertical longitudinal central plane S is also defined by the longitudinal seam N and by the axis of each particular container body 1. As viewed in feed direction V of the rounded metal blank or sheet to be welded, into container body 1, the optical device 10 is disposed ahead of the plane E defined by the axes of rotation of the pressure rollers 3, 5, extends perpendicular to the vertical longitudinal central plane S, and is pivotable toward an imaginary horizontal plane H (FIG. 2) by an angle $\beta$. The angle $\beta$ can range between $-10°$ and $+45°$; that is, the focused laser beam 15 can be inclined up to 10° downwardly and up to 45° upwardly as seen from the optical device 10, with respect to plane H. The imaginary horizontal plane H is parallel to imaginary tangent plane T (FIG. 2) of the container body 1 that extends at right angles to the vertical longitudinal central plane S through the longitudinal seam N.

Optical device 10 is also pivotable within the imaginary horizontal plane H, such that the vertical projection of axis 14 of the optical device 10, or of laser beam 12 focused by the optical device 10 into focussed laser beam 15, onto plane H or T, and the portion of the vertical longitudinal central plane S facing away from the feed direction V, as viewed vertically from above, form an angle $\alpha$ of 60°. In other words, the axis 14, viewed radially toward the prepared, but as yet unwelded, longitudinal seam, is inclined by an angle $\alpha$ with respect to the prepared longitudinal seam. Depending on the reflective or absorptive capacity of faces 16, 17 of longitudinal ends 18, 19, respectively, of the metal sheet, which faces 16, 17, are to be welded together, the angle $\alpha$ can range between 10° and 170°, preferably 45° to 90°.

Figure 11:
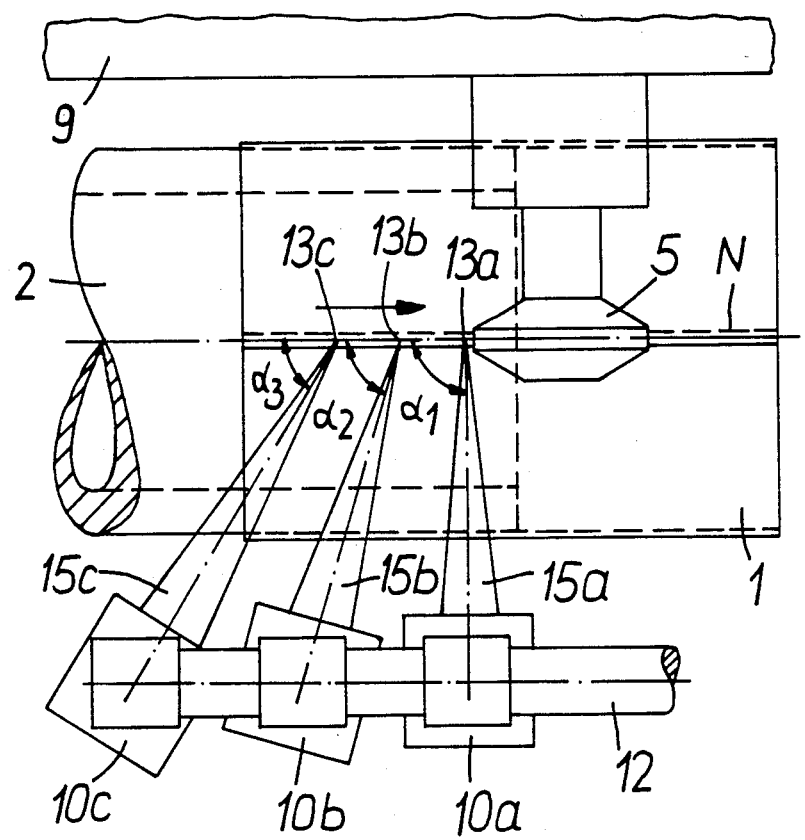
FIG. 11 is a plan view of an apparatus for laser pressure welding of an overlapping seam with an optical device having three laser apertures, i.e., three focused laser beams.

The optical device of the apparatus of FIG. 11 differs from the above-described exemplary embodiments and has three optical elements 10a, 10b, 10c, each of which transmits one-third of laser beam 12 at an angle $\alpha$-1, $\alpha$-2, $\alpha$-3, respectively, with respect to the vertical longitudinal central plane S in the form of focused laser beams 15a, 15b, 15c, respectively. There may be any positive, finite number of optical device elements, 10a, 10b, . . . , 10n. Depending on the number n of optical device elements, 10a, 10b, . . . , 10n, there are n focal points 13a, 13b, . . . , 13n on the vertical longitudinal central plane S. In FIG. 11, n=3 and there are three focal points 13a, 13b, 13c.

Figure 4:
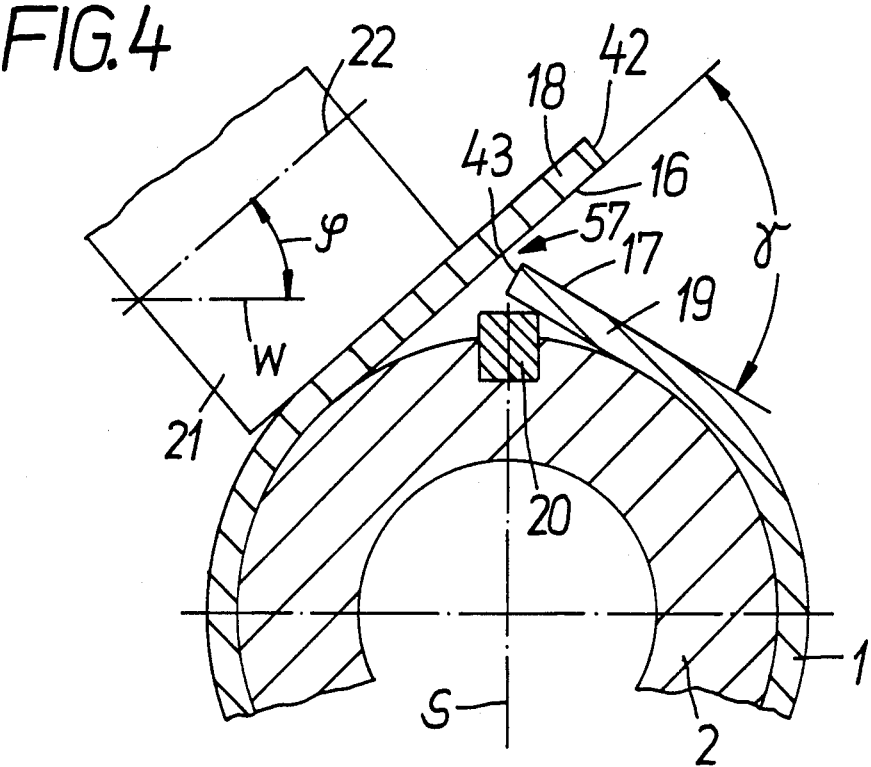
FIG. 4 is a fragmentary cross section of the apparatus during the formation of a V-shaped angular opening or welding gap between the longitudinal ends.
Figure 5:
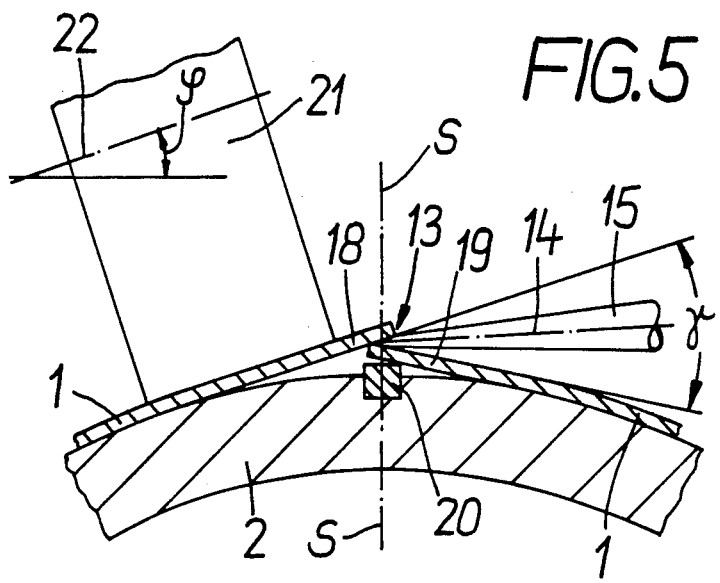
FIG. 5 is a fragmentary cross section of the apparatus during the formation of a V-shaped angular opening with longitudinal ends touching one another.

In the exemplary embodiment of FIGS. 4 and 5, the forming mandrel 2 has a strip 20, in the vicinity of its uppermost generating line, which protrudes upwardly beyond the cylindrical outer surface of the forming mandrel 2 and terminates, in the longitudinal direction, with the termination of the mandrel 2. Located next to the strip 20, on one side thereof, is a cylindrical feed roller 21, axis of rotation 22 of which is disposed in an imaginary plane transverse to the longitudinal axis of the forming mandrel 2 and is inclined by an angle $\phi$ (hereinafter "angle phi") with respect to horizontal line W.

Figure 6:
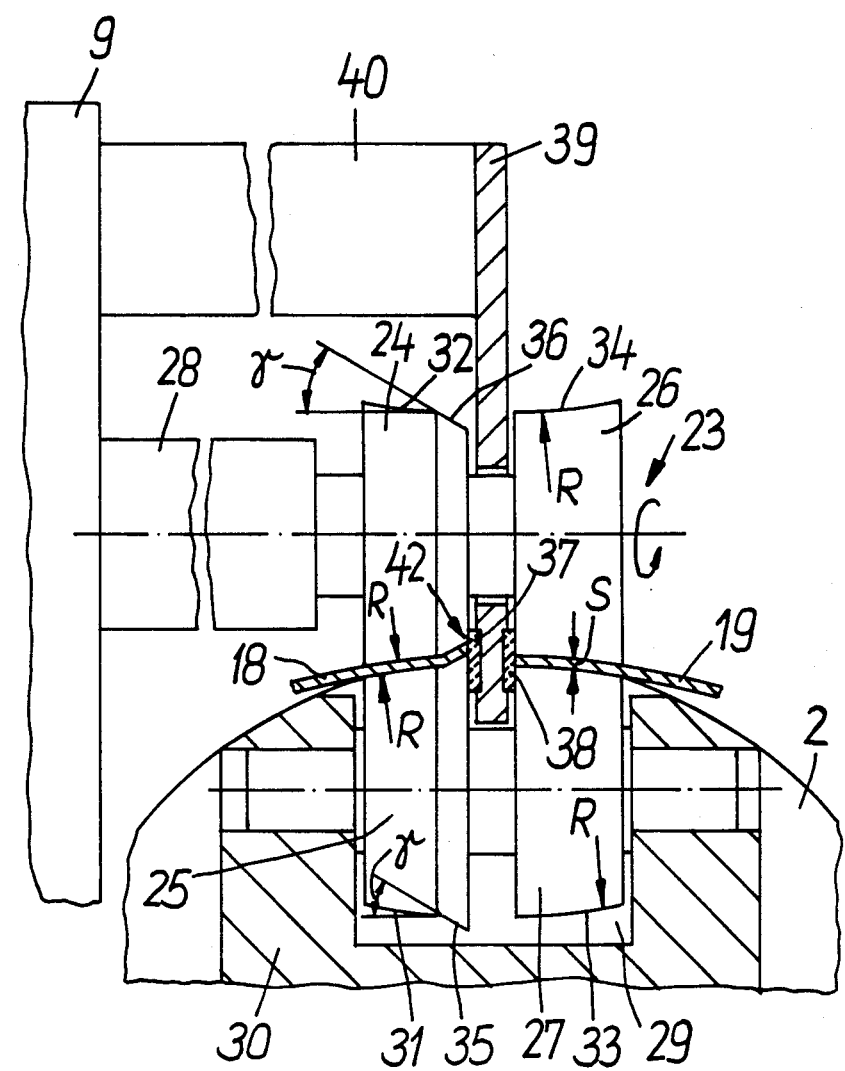
FIG. 6 is a fragmentary cross section of another embodiment of the apparatus showing an arrangement of the metal sheet for the formation of a V-shaped angular opening having longitudinal ends touching one another.
Figure 7:
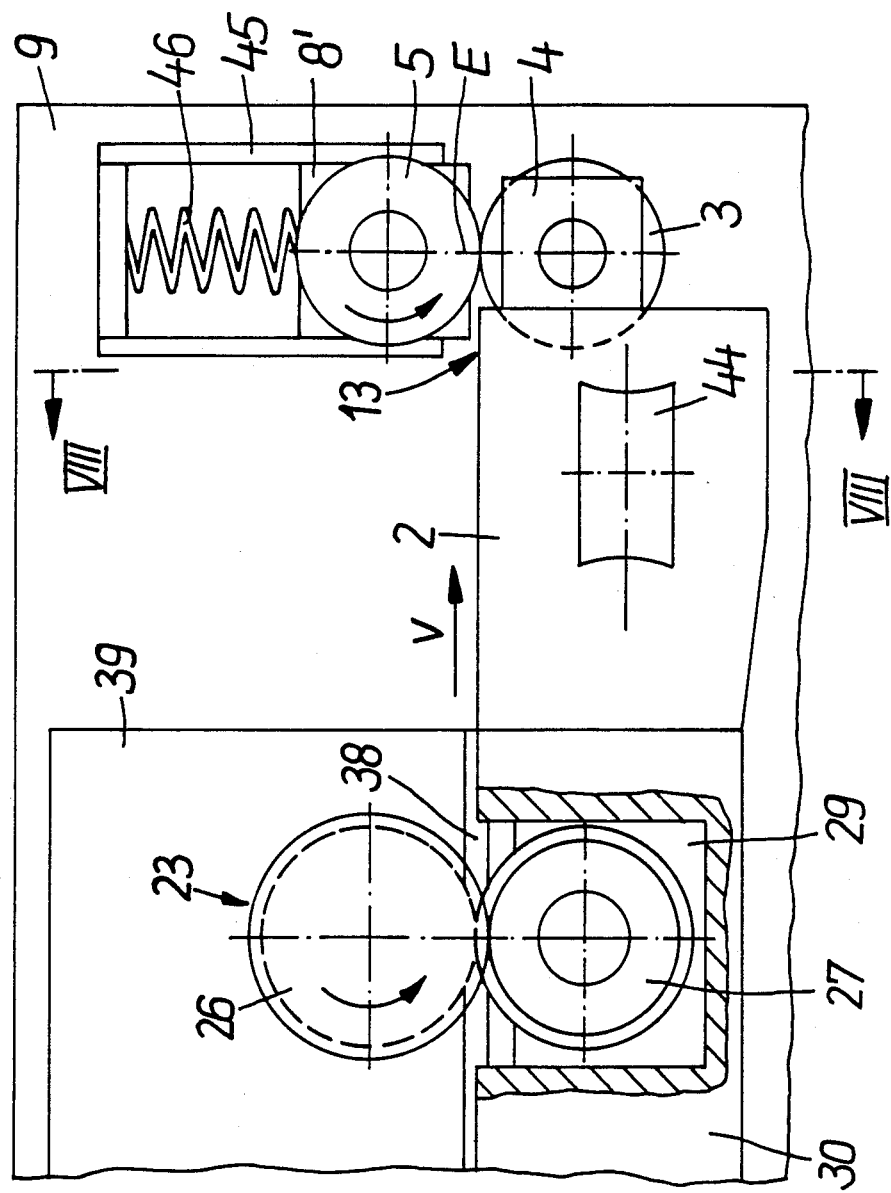
FIG. 7 is a fragmentary side view of the apparatus of FIG. 6.
Figure 8:
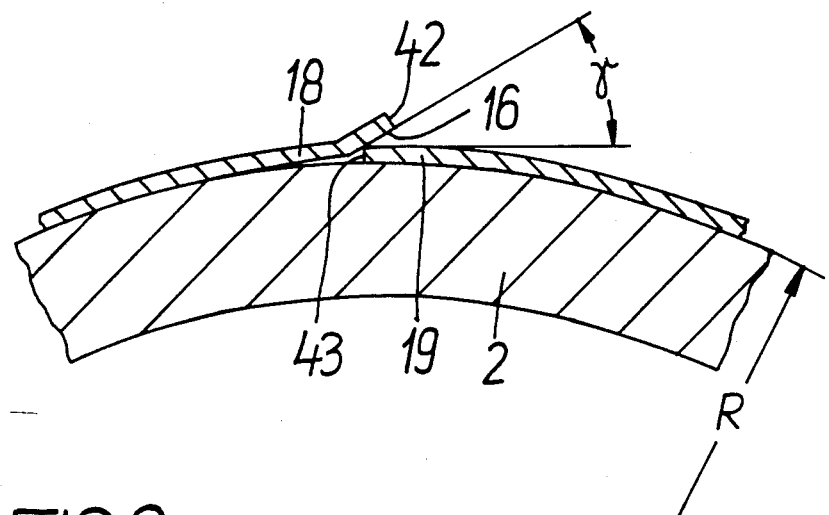
FIG. 8 is a fragmentary cross section taken along line VIII—VIII of FIG. 7 showing the location of the metal sheet ends on the forming mandrel after the passage of the arrangement of FIGS. 6 and 7 through the focal point of the focused laser beam.

In another exemplary embodiment shown in FIGS. 6-8, the forming mandrel 2 is shown as completely cylindrical at its end (see FIGS. 7 and 8). Ahead of the plane E formed by the axes of rotation of the pressure rollers 3, 5 and ahead of the focal point 13 of the focused laser beam 15, as seen in the feed direction V, the apparatus has a forming or profile roller arrangement shown generally at 23 positioned at the cylindrical end of forming mandrel 2 for bending or folding one of two longitudinal ends 18, 19, of the metal sheet (see FIGS. 6 and 7 in which longitudinal end 18 still is bent). The profile roller arrangement 23 (FIG. 6) has an upper pair of profile rollers 24, 26, which are freely rotatable and a lower pair of profile rollers 25, 27. The upper pair of profile rollers 24, 26 is overhung-mounted on a bearing block 28 secured to the base plate 9, and the lower pair of profile rollers 25, 27 is supported in a recess 29 of forming mandrel holder 30.

The lower pair of profile rollers 25, 27 have convex circumferential faces 31, 33, respectively, in the form, as seen in cross section, of a circular segment the radius R of which is equivalent to the circular segment of the outer cylindrical face of the forming mandrel 2 (compare FIGS. 6 and 8). The upper profile rollers 24, 26 have concave circumferential faces 32, 34, respectively, the generating lines of which are likewise described by a circular segment having the radius R.

With reference to FIG. 6, the lower profile roller 25 also has a conical widening flange 35 on the side thereof which is oriented toward the roller 27. The generating line of the outer face of the conical flange 35 is, as seen in cross section, inclined outwardly by an angle $\gamma$ (hereinafter "angle gamma") with respect to the tangent of the convex circumferential face 31 at the common point of contact. Adjoining the concave circumferential face 32 of the upper profile roller 24 in a direction toward the upper profile roller 26 is a conical segment 36. The generating line of the conical segment 36 is inclined inwardly by the angle gamma with respect to the tangent of the concave circumferential face 32 at the common point of contact.

With continuing reference to FIG. 6, between the profile rollers 24, 26 and 25, 27 of the profile roller pairs, two guide strips 37, 38, are provided, as seen in the feed direction V, and are made of a suitable wear-resistant material, such as hardmetal, ceramic or the like. The guide strips 37, 38 are secured to a web plate 39, which in turn is secured via a holder 40 to the base plate 9.

In the exemplary embodiment of FIG. 7, bearing 8' of the upper pressure roller 5 is movably supported in support means shown as a vertical guide 45 and is urged by a compression spring 46 toward the lower pressure roller 3. Deviating from this exemplary embodiment, the support means for upper pressure roller 5 can alternately be a rocker arm (not shown), which is optionally connected to the base plate 9 via a torsion bar (not shown).

Figure 10:
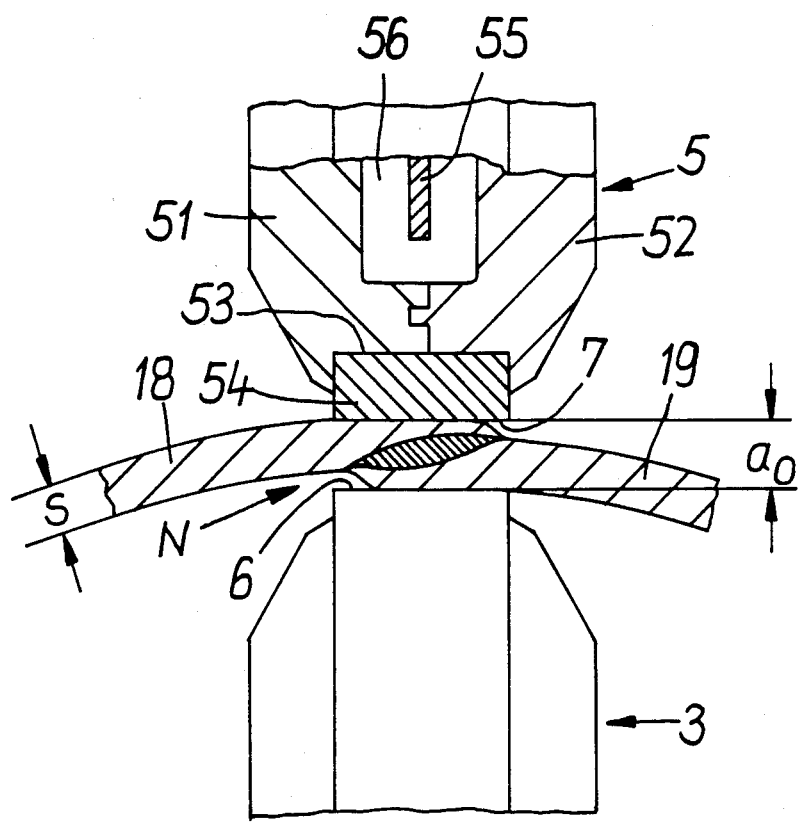
FIG. 10 is a fragmentary cross section showing one end of the welded longitudinal seam pressed between pressure rollers.

With reference to FIG. 10, the pressure rollers 3, 5 each have two roller halves 51, 52 (although only the two roller halves 51, 52 of pressure roller 5 are shown), made of copper, for example, and having defined collectively therein a common circumferential groove 53, in which is fastened a circumferential ring 54 made of, for example, hardmetal or ceramic, that forms running surfaces 6, 7. Between the respective roller halves 51, 52, there is also a partitioning disk 55, which, together with the inside surfaces of the respective rollers halves 51, 52, defines a coolant conduit 56.

In the apparatus of FIGS. 1-3, container bodies 1 are moved one after the other, the metal blank or sheet to become container body 1 being wrapped around the forming mandrel 2 and being, moved longitudinally along the forming mandrel 2. In this process and with reference to FIG. 4, the inner face of the longitudinal end 19 slides on the strip 20, while inner face 16 of the outer longitudinal end 18 is urged by the cylindrical feed roller 21 toward edge 43 of the longitudinal end 19. Depending on the angular position of the axis of rotation 22 of the cylindrical feed roller 21, inner face 16 of the longitudinal end 18 can be spaced apart by a short distance from edge 43 (FIG. 4) or can be pressed firmly against edge 43 (FIG. 5), as a result of which the inner longitudinal end 19 is well retained in its position.

The focused laser beam 15 is aimed into an angular opening 57 that is a welding gap defined between inner face 16 of the outer longitudinal end 18 and outer face 17 of the inner longitudinal end 19 (FIG. 4) or into the intersection point thereof (FIG. 5). The overlapping of longitudinal ends 18, 19 forms an acute angle $\gamma$ (hereinafter "angle gamma"). The location of the laser beam 15 with respect to faces 16, 17, or their imaginary angle-bisecting plane can be varied by pivoting optical device 10 relative to the imaginary horizontal plane H (FIG. 2) and adjusting it correspondingly in height. As a result, uniform melting of both faces 16, 17 can be attained.

Directly after passing through focal point 13 of laser beam 15, the corresponding segments of longitudinal ends 18, 19 are moved through the clearance space $a_0$, i.e., the gap between pressure rollers 3, 5 (see FIG. 10). The clearance space $a_0$ between circumferential faces 6, 7 of the pressure rollers 3, 5 is preferably less than two sheet thicknesses (2s) compared to metal sheet thickness (s), so that the longitudinal ends 18, 19 are pressed together to form a common, welded longitudinal seam N even before their molten parts have changed to solid state again. The remaining thickness thereof is likewise correspondingly less than two sheet thicknesses (2s).

In the exemplary embodiment of the apparatus and method as shown in FIG. 6, the outer longitudinal end 18 is bent outwardly by profile roller pair 24, 25. Edges 42, 43 of the longitudinal ends 18 and 19, respectively, slide along wear or guide strips 37, 38. Prior to passage through focal point 13 and pressure roller pair 3, 5, the various segments of the container body 1 and, in particular, the longitudinal ends 18, 19, are moved by additional rollers 44 (only one of which is shown in FIG. 7) into the position shown in FIG. 8. In the case of this prepared, but as yet unwelded, longitudinal seam, laser beam 15 must be aimed correspondingly more steeply than for the longitudinal seam being formed in FIG. 5.

Figure 9:
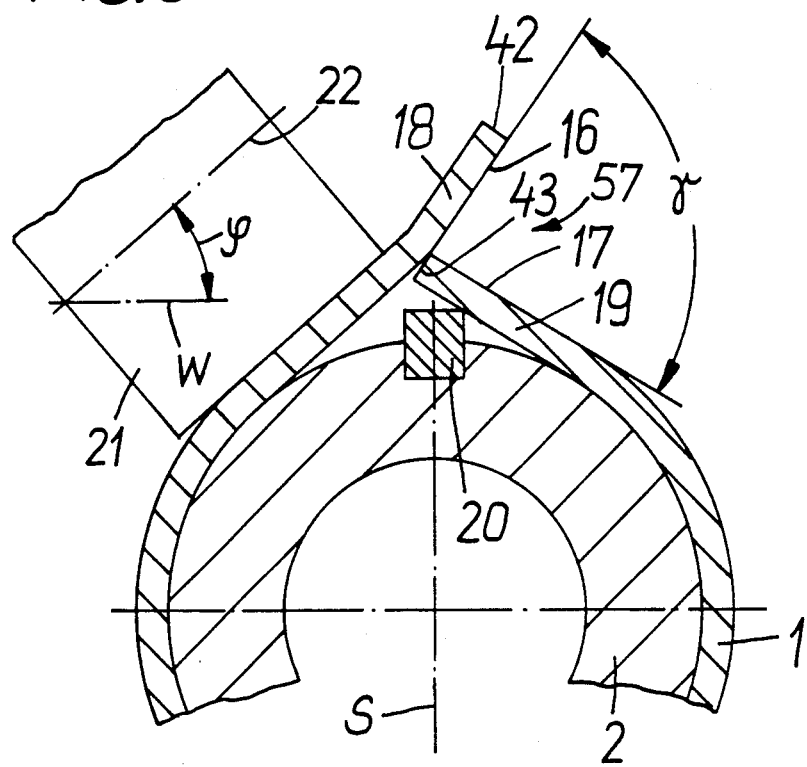
FIG. 9 is a fragmentary cross section of an apparatus embodiment showing the location of the longitudinal ends of the metal sheet on a forming mandrel provided with an upper strip, the inner or second longitudinal end resting on the strip and the outer or first longitudinal end being bent outwardly.

With reference to FIG. 9, it is also possible to allow the inner longitudinal end 19 to slide on strip 20 of the forming mandrel 2 and to press an outwardly-bent outer longitudinal end 18 against the edge 43 of the longitudinal end 19. In that case, the angle gamma of the angular opening 57 prepared for welding is particularly large.

The present disclosure relates to the subject matter disclosed in Federal Republic of Germany Patent Application No. P 36 30 889.7, filed Sept. 11th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A method for laser beam welding of longitudinal seams in container bodies having predetermined circumferential dimension, the method comprising:

providing a metal sheet having opposing first and second longitudinal ends, and opposing first and second transverse ends, the first and second longitudinal ends each having a length, a longitudinal edge, and an inner face and an outer face, and the first and second transverse ends each having a length which exceeds the predetermined circumferential dimension for each container body;

getting the first longitudinal end over the second longitudinal end, either during or after shaping of the container body, into a position, to form an acute angle and define an angular opening therebetween, which angular opening extends longitudinally along the length of the first and second longitudinal ends, by moving the longitudinal edge of the second longitudinal end toward the inner face of the first longitudinal end;

aiming at least one focused laser beam into the angular opening and causing relative movement between the focused laser beam and the angular opening along the longitudinal extension of the angular opening thereby defining a feed direction; heating at least a portion of the inner face of the first longitudinal end and at least a portion of the outer face of the second longitudinal end with the at least one focused laser beam to a temperature above the temperature which is effective as a welding temperature; and pressing together the inner face of the first longitudinal end and the outer face of the second longitudinal end while the respective faces are at or above the welding temperature, thereby forming a welded longitudinal seam.

2. The method according to claim 1, wherein the step of getting the first longitudinal end over the second longitudinal end further comprises pressing the second longitudinal end flush with and inwardly against a forming mandrel positioned therebeneath and bending the first longitudinal end outwardly.

3. The method according to claim 1, wherein the step of getting the first longitudinal end over the second longitudinal end further comprises pressing the second longitudinal end against a forming mandrel to cause the first longitudinal end to be raised and extend tangentially away from the forming mandrel while maintaining the second longitudinal end substantially flat.

4. The method according to claim 3, wherein the step of getting the first longitudinal end over the second longitudinal end further comprises bending the first longitudinal end outwardly.

5. The method according to claim 1, wherein the welded longitudinal seam lies in a vertical and longitudinal central plane through the forming mandrel, and wherein the focused laser beam has an axis the vertical projection of which onto a tangential plane through the welded longitudinal seam forms an angle which ranges from 10° to 170° with the vertical longitudinal central plane when viewed in the feed direction.

6. The method according to claim 5, wherein the angle ranges from 45° to 90°.

7. The method according to claim 1, wherein each at least one focused laser beam has a focal point and an axis which is inclined, as viewed from its focal point, with respect to a tangential plane passing through the welded longitudinal seam by an angle which ranges up to 45° upwardly and up to 10° downwardly.

8. The method according to claim 1, wherein the metal sheet has a sheet thickness and the welded longitudinal seam has a seam thickness, and wherein the pressing step results in the seam thickness being less than twice the sheet thickness.

9. An apparatus for laser beam welding of longitudinal container bodies, the apparatus comprising:

means for guiding and positioning a metal sheet, which metal sheet has opposing first and second longitudinal end;

means, including a forming mandrel having an axis, for getting the first longitudinal end over the second longitudinal end and forming an angular opening therebetween;

an optical device for supplying at least one focused laser beam to the angular opening to heat respective portions of the first and second longitudinal ends, wherein the welded longtudinal seam to be formed and the axis of the forming mandrel lie in a vertical longitudinal central plane, and wherein the optical device is angularly variably adjustable with respect to the vertical longitudinal central plane; and a pair of pressure rollers positioned one above the other and on either side of the overlapped first and second longitudinal ends, the pair of pressure rollers having a clearance space therebetween which is adjustable and having a drive means for at least one of the pair of pressure rollers, for pressing together the heated first and second longitudinal ends to form an overlapped seam.

10. The apparatus according to claim 9, wherein the means for guiding and positioning the metal sheet guides the metal sheet through the apparatus in a feed direction, and wherein at least one of the pair of pressure rollers is moveably supported transversely to the feed direction with respect to the other of the pair of pressure rollers and is acted upon with pressure by an adjustable force in a direction towards the pair of pressure rollers.

11. The apparatus according to claim 9, wherein the means for forming an angular opening further comprises a feed roller, and wherein the forming mandrel has a strip positioned along the vertical longitudinal plane and protruding beyond the outer surface thereof for contacting the second longitudinal end.

12. The apparatus according to claim 9, wherein the means for forming an angular opening further comprises a first pair of profile rollers positioned one above the other and on either side of the first longitudinal end and a second pair of profile rollers positioned one above the other and on either side of the second longitudinal end, each profile roller and the first pair and the second pair of profile rollers having running faces adapted to the shape of the container body, the first pair of profile rollers having an outer profile roller located outside of the forming mandrel and having a segment which tapers toward the second longitudinal end, and having an inner profile roller located at least partially within the forming mandrel and having a widening flange, and the second pair of profile rollers having an outer profile roller located outside of the forming mandrel and having an inner profile roller located at least parially within the forming mandrel.

13. The apparatus according to claim 12, wherein the respective outer profile rollers of the first and second pairs of profile rollers have drive means.

14. The apparatus according to claim 12, wherein at least one guide strip is positioned between the first pair of profile rollers and the second pair of profile rollers.

15. The apparatus according to claim 9, wherein the optical device is additionally angularly variably adjustable with respect to a tangential plane that is defined by the welded longitudinal seam to be formed.

16. The apparatus according to claim 9, wherein the pair of pressure rollers includes an outer pressure roller provided outwardly from the forming mandrel and an inner pressure roller provided at least partially within the forming mandrel, and wherein the outer pressure roller has a concave circumferential face having a radius which ranges from the radius of the container body to be formed to infinity, and the inner pressure roller has a convex circumferential face having a radius which ranges from a finite value up to the radius of the container body to be formed.

17. The apparatus according to claim 9, wherein the pair of pressure rollers includes an outer roller positioned outwardly from the forming mandrel and has drive means.

18. The apparatus according to claim 9, wherein the pair of pressure rollers is comprised of a material having good thermal conductivity, define hollow spaces therein, respectively, for the flow therethrough of coolants, and have respective running faces, each respective running face being provided with a circumferential ring comprised of a heat resistant material.

* * * * *